May 19, 1970   H. L. EMMONS ET AL   3,512,902
INDUCTIVE CORE DEVICE AND METHOD OF MAKING THE SAME
Filed April 22, 1968   2 Sheets-Sheet 1
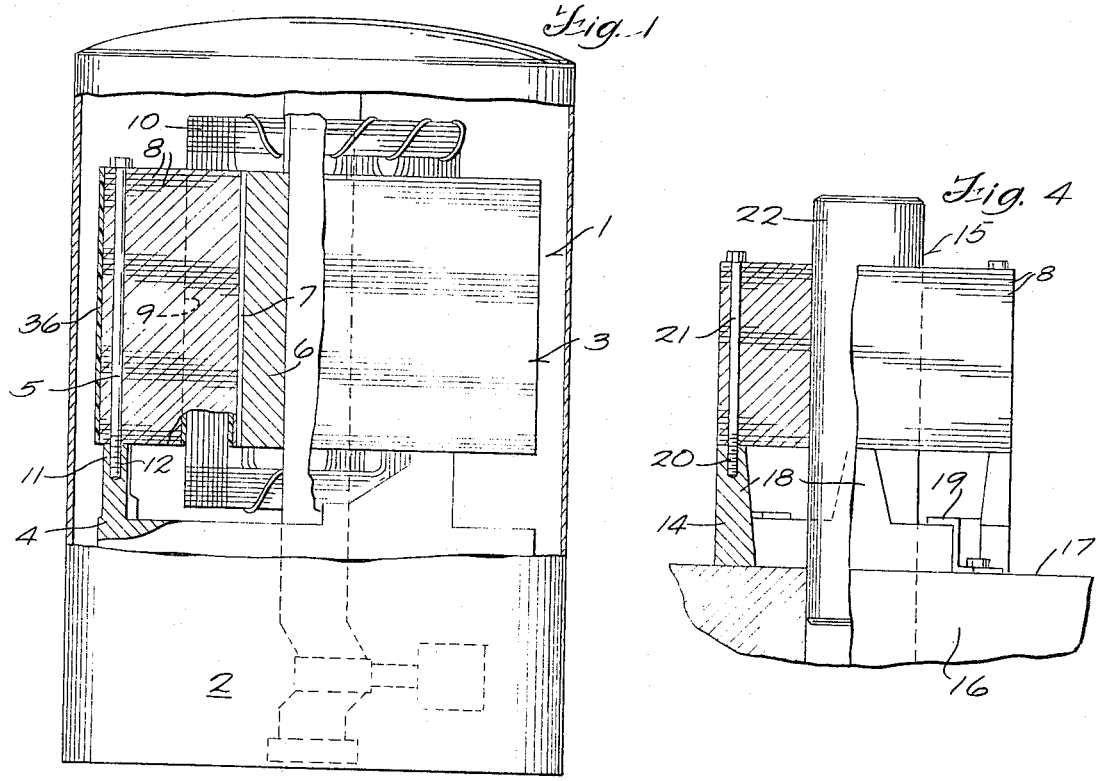
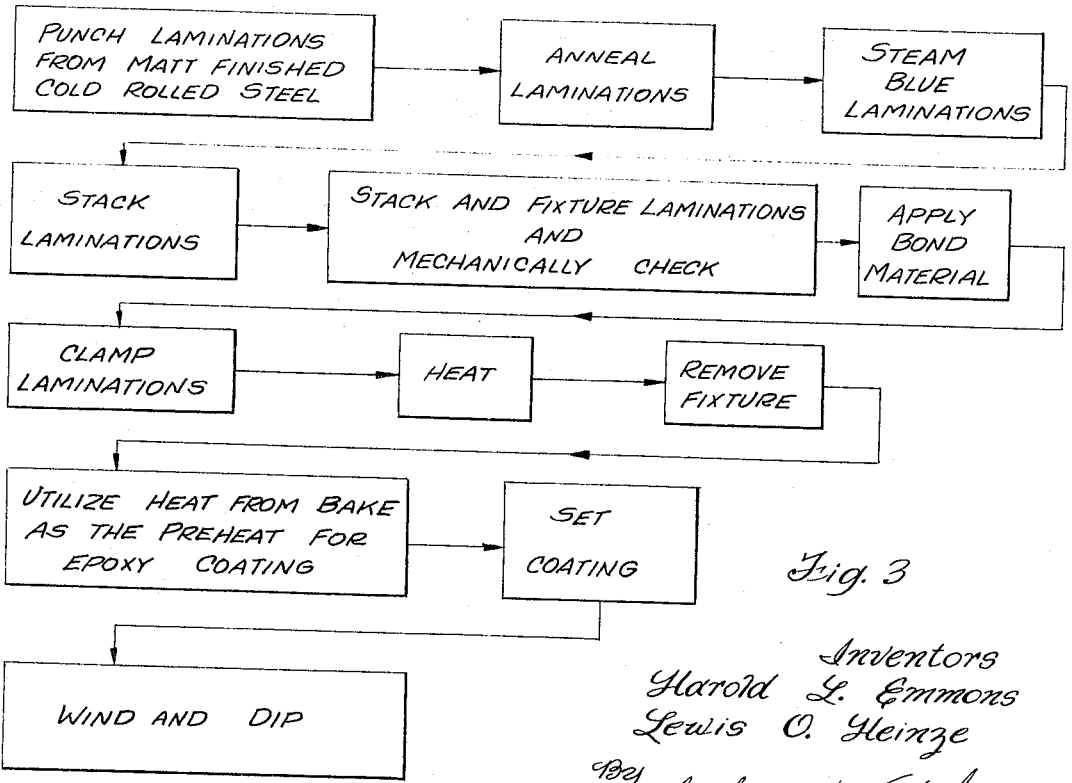
Inventors
Harold L. Emmons
Lewis O. Heinze
By Andrus & Starke
Attorneys

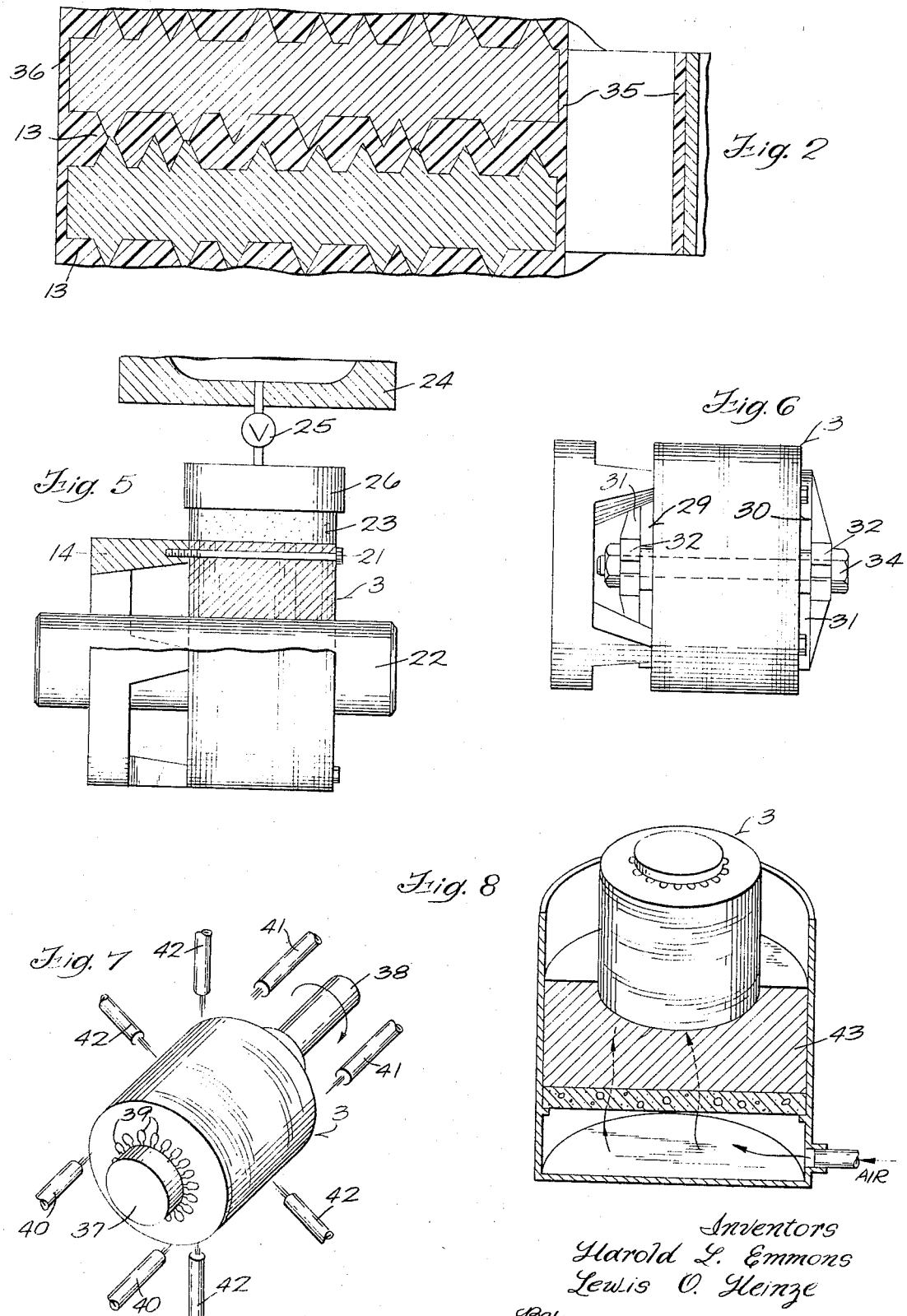

United States Patent Office 3,512,902
Patented May 19, 1970

3,512,902
INDUCTIVE CORE DEVICE AND METHOD OF MAKING THE SAME
Harold L. Emmons, Tipp City, and Lewis O. Heinze, Dayton, Ohio, assignors to A. O. Smith Corporation, Milwaukee, Wis., a corporation of New York
Filed Apr. 22, 1968, Ser. No. 723,133
Int. Cl. F04b 35/04
U.S. Cl. 417—371
11 Claims

ABSTRACT OF THE DISCLOSURE

This disclosure relates to a laminated annular stator having a resin bonding of adjacent laminations to each other and a thin resin coating to essentially hermetically seal the space between laminations and to the method of making it. The laminations are stamped from a cold rolled steel having a matted finish and annealed and steam blued. The indivdual laminations are stacked and clamped and a resin applied between the metal-to-metal point type contacts established by the roughened surface. The assembly is based to set the adhesive and before appreciable cooling of the core, is placed in a spray or fluidized resin bed unit to simultaneously apply a layer of slot insulation and an exterior peripheral sealing coat and thereafter again heated to cure the resin. The innermost peripheral surface of the teeth defining the slots is masked during the last coating and after windings are applied, the unit is dipped in varnish to coat the windings.

---

This invention relates to an inductive core device and the method of making the same and particularly to an annular stator core of a compressor motor.

Inductive devices employing cores formed of a magnetic material are often formed of a laminated construction because of the improved magnetic and electrical characteristics. The core, particularly in motors, generators and the like, is provided with a plurality of slots within which the appropriate winding or windings are disposed. An improved method of interconnecting the laminations has been suggested wherein an adhesive in the form of an epoxy resin or the like is interposed between the laminations and acts as a bonding agent directly interconnecting the laminations and eliminating the clamping bolts, edges, welds and the like.

The copending application of Pleiss et al., Ser. No. 570,533, filed Aug. 5, 1966 and entitled Motor Stator Assembly and Method of Assembly, discloses a highly satisfactory and reliable system for so bonding a laminated structure. As disclosed therein, the stator of a compressor motor is mounted to the compressor frame by a plurality of mounting bolts. Where adhesive lamination bonding is employed, problems have arisen in connection with flow of the material under operating temperatures and pressures.

Generally, the windings are insulated from the core through insulation on the winding conductor, as well as in the core slots.

Various systems have recently been suggested for applying an insulating coating in powder form onto the exposed and heated surface of the slots. An epoxy resin or some similar powdered material which melts and flows slightly into a covering gel and which subsequently hardens into an integral adherent layer is applied to the wall. It has been found that this can provide a highly satisfactory insulating coating.

The present invention is particularly directed to an improved laminated structure which is formed into an integrated adhesively connected assembly by bonding of adjacent laminations to each other and applying a thin plastic coating to essentially hermetically seal the space between laminations by a thin film or membrane. Applicant has found that an annular motor stator constructed in accordance with the present invention is highly satisfactory for motors of refrigerant compressor units. The sealed unit is adapted to a practical, mass production type construction as materials used during manufacture such as oil, water, solvents, etc. between the laminations of the motor during manufacture of the motor or during assembly of the motor into a compressor. Such materials between the lamination would contaminate the refrigeration system.

Generally, in accordance with the present invention, several laminations are stamped from a matted surface steel or the like and interconnected by a suitable adhesive between the members which is similarly set. The core is heated to set the adhesive as a final step in the interconnection of the laminations. This heating step is also employed as a preheat step for applying an exterior sealing coat to the exterior of the motor core. If desired, the process may simultaneously apply an interior coat to the winding slots to provide suitable slot insulation. In a particular novel method of the present invention, the matted surface steel provides a roughness which has been heretofore considered undesirable and minimized. The present invention specifically requires a matted surface and one substantially in excess of that which has heretofore been present in the laminations for inductive cores, such as a motor stator and the like. Generally it has been found that the matted surface laminations should be selected with a roughness of 40 to 70 microns. The individual laminations are then steam blued to establish a substantial oxide coating and one sufficient to maintain electrical separation of the areas or points of contact between adjacent laminations. The individual laminations are clamped into the stacked relationship and the bonding material interposed therebetween. The roughened surface provides for a metal-to-metal point distributed contact with the adhesive flowing in between the metal-to-metal point type contacts. This permits interposition of the binding material essentially throughout the total exposed mating surfaces of the laminations without regard to the clamping or mounting holes for the core unit. The assembly is baked to set the adhesive and before appreciably cooling of the core, is moved into an exterior coating process for simultaneously applying a suitable thermal set coating to protect selected peripheral exterior areas. Known spray or fluidized bed systems may be employed to simultaneously apply a layer of slot insulation and an exterior peripheral sealing coat to hermetically seal the space between the laminations and simultaneously establish a suitable slot insulation. Certain areas may be masked. For example, in an annular stator, the innermost peripheral surface of the teeth defining the slots are not covered with the slot insulation to minimize the air gap with respect to the rotor. A suitable protective mask may be disposed over the teeth ends.

Thereafter, the core is wound with appropriate windings and dipped in a varnish in accordance with well-known or standard procedures. The latter not only serves to coat the windings with the desired insulation but will simultaneously provide a very thin coating on the inner periphery of the teeth of an annular stator. Alternatively the end turns may be dipped and the stator inverted to allow the varnish to move through the slots without varnish on the ends of the teeth.

Applicant has found that the improved method provides a highly satisfactory motor stator which can readily be incorporated into a compressor or the like.

The drawings furnished herewith illustrate a preferred construction in accordance with the present invention disclosing the above advantages and features as well as others which will readily be understood by those skilled in the art from the following description.

In the drawing:

FIG. 1 is a diagrammatic illustration showing a refrigerant-compressor motor mounting construction employing a stator constructed in accordance with the present invention;

FIG. 2 is an enlarged fragmentary view of the laminated stator core shown in FIG. 1;

FIG. 3 is a flow diagram showing a preferred and novel method of forming the stator core of the present invention;

FIG. 4 is a fixture showing one step in the method;

FIG. 5 is a view showing the step of applying the interlamination adhesive in the process of forming the stator;

FIG. 6 is a view showing the laminated core fixtured for setting of the interlamination adhesive;

FIG. 7 is a diagrammatic illustration showing the application of an exterior sealing coating to the stator in the process of formation thereof;

FIG. 8 is a view similar to FIG. 5 showing an alternative method of employing an exterior coating; and FIG. 9 is a diagrammatic illustration showing the final step in which the completed stator is finally provided with a final varnish insulation.

Referring to the drawings, and particularly to FIG. 1, a motor 1 is mounted as a part of a compressor 2. The motor 1 includes an annular stator unit 3 mounted directly on the compressor casting or housing 4 and held thereto by circumferentially distributed mounting bolts 5. A rotor 6 is rotatably mounted within the stator unit 3 and journaled within suitable fixed bearings, not shown, to provide precise alignment of the rotor 6 within the annular stator unit 3 with a predetermined air gap 7 therebetween.

The present invention is particularly directed to forming of the stator unit 3 which generally includes a plurality of similar individual ring laminations 8 stacked to form a core. Each of the laminations 8 is provided with corresponding winding notches or slots 9 on the inner periphery to receive a winding 10. The stator winding 10 is wound in known manners within the winding slots and project slightly outwardly thereof to the opposite end faces of the stator core. The stator core rests directly on a mounting wall 11 of the compressor housing 4 and is tightly clamped thereto by the plurality of through bolts 5 which extend through suitable openings in the outer diameter of the core and into corresponding threaded openings 12 in the mounting wall 11.

The stator laminations 8 in accordance with the present invention are interconnected by a bonding material 13 on the interfaces of the laminations. As previously noted, the stator core is secured to the housing 4 under relatively high compressive forces to provide accurate location of the stator core with respect to the rotor 6 in order to maintain a uniform concentric arrangement. This maintains a constant and uniform air gap of minimal length between the stator core and the rotor 6 to provide the desired and necessary starting torque over long periods of time as long as the lamination 8, and particularly the material or coating 13, remains intact.

The stator core is specially constructed in accordance with the following teaching constituting the subject matter of the present invention to prevent flow of the bonding material 13 under operative condition and to further prevent entrance of the refrigerant gas or liquid between the laminations.

Generally, the steps in the assembly are as shown in the flow diagram of FIG. 3. The laminations 8 are preferably formed by a conventional punch process. The laminations are, however, formed from a matt finished cold rolled steel such that the faces or surfaces include peaks and valleys through the entire surface. The laminations are formed with a matted surface having a roughness within the range of 40 to 70 microns and preferably in the order of 55 microns. The matt finish of the present invention is generally measured by a profilometer in accordance with known operations of such a device. The individual laminations 8 are then preferably suitably degreased and annealed and are then steam blued, which produces a relatively heavy scale or oxide coating on the matted surfaces of the laminations.

Further, the oxide coating produced on the laminations is substantially increased to provide essentially 100 times the electrical resistance normally provided in bonded stator constructions. Thus, the electrical resistance will normally be of the order of 20 ohms in accordance with the present invention in contrast to the more conventional resistance of .2 ohm-centimeter squared The laminations 8 are stacked and clamped to an assembly base 14 at circumferential spaced locations with an aligning arbor 15, as shown in FIG. 4, which may then be checked for stack length, face runout of the assembly and the like. A bonding material 13 is applied to the subassembly of FIG. 4 generally in accordance with the teaching of the previously referred to pending application of Pleiss et al.

As most clearly shown in FIGS. 4 and 5, the initial sub-assembly includes providing an assembly table or support 16 having a flat mounting surface 17. The locating arbor 15 projects upwardly from the parallel or the flat surface with a precise 90 degrees between the flat surface 17 and the cylindrical arbor 15. The stator assembly base 14 is disposed over the arbor 15.

The illustrated assembly base 14 is an annular member having a ring-shaped lower portion from which four parallel arms 18 project upwardly, terminating in a common plane. The back face of the lower portion and the ends of the arms 18 are specially finished to be flat and parallel to a high degree and in a practical application within .001 TIR. Clamping brackets 19 are bolted to the table 16 and include arms overlying the base 14 between the arms 18 to firmly clamp the base to the support. As a result, the outer ends of the arm provide a surface at 90 degrees to the arbor.

After the placement of the base 14 over the arbor 15, the selected stack of laminations 8 are placed on the arbor and rest on the flat parallel surfaces of the upstanding arms 18. The arbor 15 is provided with a diameter essentially equal to that of the inner diameter of the core laminations 8 to accurately locate the laminations in superposed relation. The laminations 8 are assembled on the arbor with bolt holes aligned with each other and with correspondingly tapped openings 20 in the outer ends of the arms.

Clamping bolts 21 are then extended through the bolt holes in the laminations 8 and threaded into the tapped openings 20. The bolts 21 are drawn up to establish a selected clamping torque.

The brackets 19 are then released and the assembly of laminations 8 and base 14 is removed. The core is checked for length and face runout; that is, the flatness of the end face of the assembly.

The assembly of core and base is mounted to have the bonding material applied to the outer peripheral surface of the core. A particularly satisfactory method is shown in FIG. 5. As shown therein, the assembly is mounted on a rotating shaft member 22. A felt pad 23 having a width essentially corresponding to that of the axail length of total laminations 8 is aligned with a bears on the periphery of the laminations. A bonding liquid source 24 is connected by a metering valve 25 to a distributor 26 secured to the pad 23. Rotation of the subassembly continuously applies the adhesive material or the like to the exposed outer surfaces of the laminations 8.

The bonding liquid penetrates completely between the lamination as a result of capillary action and fills the valleys defined by the peaks of the matted surfaces of the adjacent laminations.

After a selected time period sufficient to insure adequate penetration of the bonding liquid, the sub-assembly is removed from shaft 22 and all excess liquid wiped or otherwise removed from all of the faces and exterior surfaces of the core and the base. A mist of air and varnish solvent may then be sprayed on the face of the core and wiped off with a dry towel member or the like.

After removal of the excess liquid, the sub-assembly is further clamped between a pair of similar spider-shaped clamp members 29 and 30, such as shown and disclosed in the Pleiss et al. application. Each clamp member is spider-shaped having perpendicularly projecting arms 31 extending from a central apertured hub 32. Generally the clamp members 29 and 30 are assembled to the opposite ends of the stator core engaging the end face or laminations of the core intermediate the clamping bolts 21. The clamps 29 and 30 are constructed to permit insertion between the clamping legs of base 14. A clamping bolt 34 is then passed through the central openings in hubs 32 to the clamp members and drawn up to restrict the total flare between laminations to a selected degree. This second sub-assembly is then disposed within a suitable oven and raised to a selected working or setting temperature where it is held for a predetermined period of time to completely set the bonding material to thereby bond the laminations to each other and provide a bonded core.

The bonded core is removed from the oven and the fixtures. While at the raised temperature, the slots 9 and the exterior are coated with a suitable insulating and sealing material to form the slot insulation 35 lining the slots 9 and an exterior sealing cover 36 over the outer peripheral surface.

Referring particularly to FIG. 7, the pre-heated and bonded core is shown mounted in a spray assembly for applying of an epoxy resin or the like in powdered form to the exterior surface and to the slot surfaces of the core. In FIG. 7, a cylindrical mask 37 is provided on the outer end of a rotatable shaft 38 and extends through the stator core. The mask 37 essentially corresponds to the internal diameter of the annular stator core and is fitted closely therewith to cover the inner peripheral ends of the teeth 39 defining the slots 9. Spray nozzles 40 and 41 are provided adjacent the opposite end faces of the core, generally in the plane of the slots 9. Additional nozzles 42 are circumferentially spaced about the core to direct the powdered epoxy resin onto the outer peripheral surface of the heated core. The core is rotated relative to such nozzles 40–42 to cover the exterior surface and the slot surfaces. By proper location of the nozzles 40 and 41, there is no need to mask the end faces of the core. The machine is so constructed to insure that the coating is essentially only applied to the inner surfaces of the slots.

A highly satisfactory epoxy spray coating apparatus for providing the slot lining is commercially available from the Possis Machine Corporation of 825 Rhode Island Ave. S., Minneapolis, Minn. This unit is readily modified by the addition of nozzles 42 to simultaneously cover the outer peripheral surface with coating 36.

An alternating suitable spray apparatus which may be employed is also disclosed in a paper presented at the Fifth E. I. Conference, 1963, and the discussion of which was reprinted in reprint No. T–153–51 available from the AIEE. The fluidized material may also be applied to the core slots and to the exterior surface by immersion of the bed in a fluidized bed 43 of the powder, for example as diagrammatically shown in FIG. 6. Apparatus for establishing a fluidized bed is generally discussed and disclosed in the February 1963 issue of Electrical Engineering in an article entitled, "New Production Economics in Fluidized-Bed Motor Insulation," by William I. Huyett of the Polymer Corp. of Reading, Pa. In either system, the insulating and sealing epoxy resin is applied to the core which utilizes the heat from the previous bake cycle as a preheat for the application of the coating to the desired thickness.

The coated unit is removed from the applicator and inserted in a separate heat oven or the like to set the slot insulation 35 and the exterior coating 36.

The stator core is then wound with winding 10 and finally dipped in a varnish or the like to coat the winding ends and, if desired, to simultaneously cover the inner peripheral surface of the teeth 39. Generally, in a preferred method, only the end turns of the winding is dipped and the stator inverted to dispose the dipped end to the top. The varnish will move through the slots without coating of the ends of the teeth. However, the unit remains essentially sealed by the outer special thin sealing coat and a reasonable inner seal provided by the adhesively bonded lamination.

The bonding material 13 employed for connecting of the laminations preferably includes an epoxy resin in a suitable carrier with a solid content within the range of 14 to 25% to provide the desired shear strength. The lower solid range is preferable for purposes of minimizing cleanup, but does somewhat narrow the temperature and time range which can be required for curing of the resin. As the solids content is increased, however, the shear strength will increase. Certain applications will therefore require a content at the higher side of the range. Further, the specific gravity of the bonding is preferably in the range of .960 to .972 at 70° F. This is essentially more viscous than the conventional mix heretofore employed in connection with motor insulating processes, but has been found to produce highly satisfactory results.

The present invention has been found to provide a highly reliable and long-life laminated core and method of making the same, particularly for the laminated core of a motor which is mounted under high pressure sufficient to tend to cause the flow of the bonding material between the laminations. Applicant has found that a substantial increase in the roughness characteristics eliminates the transfer of the pressures to the bonding materials and thereby essentially eliminates the flowing tendency. This, in turn, results in a firm and stable mounting of the laminated core. Further, the exterior peripheral sealing coat in combination with the adhesively bound laminations, has been found to establish a reliable enclosed laminated core. The seal may, if desired, also include the dipping of the wound stator core and subsequent baking. The seal provided by the special outer coat and the bonded lamination, and the final dipped and baked varnish when used, permits a simplified and novel motor compressor assembly in which the exhaust manifold and tubing may be eliminated or substantially reduced with a resulting decrease in the unit cost. The motor of the present invention may be mounted in the compressor with a pressure seal between the high pressure side and the low pressure side of the compressor. The compressor shell may then be employed directly as gas discharge means for exiting of the hot, high pressure gas from the cylinder. The sealed stator also essentially eliminates the danger of introduction of refrigeraant gases, liquids and the like between the laminations.

The present invention thus provides an improved sealed laminated core unit and particularly an improved stator unit for a refrigerant compressor.

Various modes of carrying out the invention are contemplated as being within the scope of the following claims particularly pointing out and distinctly claiming the subject matter which is regarded as the invention.

We claim:

1. A laminated electrical core having a plurality of metal laminations arranged in abutting relationship and interconnected by an adhesive interposed between the laminations, the improvement including the abutting faces of said laminations including substantial valleys and peaks to establish dispersed metal-to-metal contacts with the adhesive between said contacts.

2. The laminated electrical core of claim 1, constructed to operate at a selected environmental temperature and including a plurality of core mounting bolts passing through the core in spaced relation to each other and establishing a pressure tending to cause said adhesive to flow at the selected temperature, said metal laminations having a sufficient oxide surface coating to maintain electrical isolation of the laminations at said contacts to minimize eddy current losses.

3. The laminated core of claim 1, wherein each of said laminations is a cold rolled steel having a matted finish with a roughness within the range of 40 to 70 microns on both surfaces to define valleys and peaks.

4. The laminated core of claim 1, wherein said core is an annular motor stator core including corresponding laminations having circumferentially spaced mounting openings, said laminations being formed of a cold rolled steel having a matted finish within the range of 40 to 70 microns to define said valleys and peaks and establish the limited metal-to-metal contact, and said laminations having a sufficient insulating oxide surface to maintain electrical isolation of the laminations under a selected pressure.

5. The laminated core of claim 1 wherein said core is an annular motor stator core of a motor driven compressor and being adapted to operate at a selected elevated environmental temperature, means to mount said core within said compressor with the lower pressure gas passing through the core and the high pressure gas passing over the exterior of the core.

6. A laminated electrical core having a plurality of metal laminations arranged in abutting relationship and interconnected by an adhesive interposed between the laminations, the improvement including having the abutting faces of said laminations including substantial valleys and peaks to establish limited metal-to-metal contacts with the adhesive between said contacts, and means to clamp said laminations under substantial pressure, said laminations having a sufficient insulating surface to maintain electrical isolation of the laminations at said contacts under said pressure to minimize eddy current losses.

7. The method of forming a laminated magnetic core, comprising the steps of stamping the individual laminations from a flat steel having a matted finish defining randomly disposed valleys and peaks and simultaneously forming a plurality of mounting openings, steam blue the laminations to establish a selected oxide surface, clamping a plurality of the lamination by bolt means passing through mounting openings with peaks of the individual laminations in contact, applying a thermoset uncured resin between said laminations to fill said valleys, clamping the core between said bolt means, baking said core to cure said resin, and immediately after the baking and prior to cooling of the core, applying a sealing resin to the exterior surface of the core to hermetically enclose the lamination.

8. The method of forming a laminated magnetic core, comprising the steps of stamping the individual laminations from a flat steel having a matted finish defining randomly disposel valleys and peaks with metal-to-metal contact established by said peaks, applying a thermoset uncured resin between said laminations to fill said valleys, clamping the core lamination together under a selected pressure, and baking said core to heat the core and cure said resin.

9. The method of claim 8, including the final steps of applying a sealing resin to the exterior surface of the core prior to appreciably cooling of the core, and baking said core to cure said sealing resin and hermetically close the space between said laminations on the outer exterior of said core.

10. The method of forming a laminated magnetic core, comprising the steps of stamping the individual laminations from a flat steel having a matted finish defining randomly disposed valleys and peaks, steam blue the laminations to establish a selected oxide surface, clamping the lamination by bolt means passing through said mounting openings with peaks of the individual laminations in contact, applying a thermoset uncured resin between said laminations to fill said valleys, clamping the core between said bolt means, baking said core to cure said resin, and immediately after the baking and prior to cooling of the core applying a sealing resin to the exterior surface of the core to hermetically enclose the lamination.

11. The method of claim 10, including the steps of treating said laminations to form an oxide on the surfaces to maintain electrical isolation of the laminations under said clamping pressures.

References Cited

UNITED STATES PATENTS

| 1,369,187 | 2/1921 | Perry | 161—120 XR |
| 2,716,724 | 8/1955 | Burian | 310—259 XR |
| 3,299,304 | 1/1967 | Hull | 310—217 |

ROBERT M. WALKER, Primary Examiner

U.S. Cl. X.R.

29—596; 161—120; 310—217, 259

UNITED STATES PATENT OFFICE
CERTIFICATE OF CORRECTION

Patent No. 3,512,902          Dated 5/19/70

Inventor(s) Harold L. Emmons and Lewis O. Heinze

It is certified that error appears in the above-identified patent and that said Letters Patent are hereby corrected as shown below:

In the Specification:

Column 4, line 15, after "squared" insert a period (.)

Column 4, line 66, cancel "axail" and substitute therefore ---axial---

Column 4, line 66, cancel "a" and substitute therefore ---and---

Column 6, line 31, cancel "to force" and substitute therefore ---tofore---

Column 6, line 61, cancel "refrigeraant" and substitute therefore ---refrigerant---

In the Claims:

Column 8, line 11, cancel "disposel" and substitute therefore ---disposed---

SIGNED AND SEALED
OCT 27 1970

(SEAL)
Attest:

Edward M. Fletcher, Jr.
Attesting Officer

WILLIAM E. SCHUYLER, JR.
Commissioner of Patents